US012561777B2

(12) United States Patent
Schwartz et al.

(10) Patent No.: US 12,561,777 B2
(45) Date of Patent: Feb. 24, 2026

(54) ANOMALY DETECTION USING NEURAL RADIANCE FIELDS

(71) Applicant: International Business Machines Corporation, Armonk, NY (US)

(72) Inventors: Eliyahu Schwartz, Haifa (IL); Leonid Karlinsky, Acton, MA (US); Assaf Arbelle, Lehvot Haviva (IL); Sivan Harary, Manof (IL); Roi Herzig, Hod Hasharon (IL)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 18/312,085

(22) Filed: May 4, 2023

(65) Prior Publication Data

US 2024/0370983 A1 Nov. 7, 2024

(51) Int. Cl.
*G06T 7/00* (2017.01)
*G06T 11/00* (2006.01)

(52) U.S. Cl.
CPC ............ *G06T 7/0002* (2013.01); *G06T 11/00* (2013.01); *G06T 2207/10024* (2013.01); *G06T 2207/10028* (2013.01); *G06T 2207/20081* (2013.01); *G06T 2207/20084* (2013.01); *G06T 2207/20212* (2013.01); *G06T 2207/30108* (2013.01)

(58) Field of Classification Search
CPC ................... G06T 7/0002; G06T 11/00; G06T 2207/10024; G06T 2207/10028; G06T 2207/20081; G06T 2207/20084; G06T 2207/2012; G06T 2207/30108
See application file for complete search history.

(56) References Cited

U.S. PATENT DOCUMENTS

| | | | | |
|---|---|---|---|---|
| 11,172,148 | B2 * | 11/2021 | Overbeck | H04N 19/00 |
| 11,308,675 | B2 * | 4/2022 | Wang | G06N 3/0464 |
| 11,557,027 | B2 * | 1/2023 | Wen | G06V 10/751 |
| 12,073,507 | B2 * | 8/2024 | Xu | G06T 15/80 |
| 12,223,594 | B2 * | 2/2025 | Coffman | G06T 7/0002 |
| 2002/0039436 | A1 * | 4/2002 | Alumot | G01N 21/956 |
| | | | | 382/218 |
| 2015/0265187 | A1 * | 9/2015 | Bernal | A61B 5/1128 |
| | | | | 600/534 |
| 2024/0273811 | A1 * | 8/2024 | Radwan | G06T 15/205 |

FOREIGN PATENT DOCUMENTS

NO        2022119844 A1      6/2022

OTHER PUBLICATIONS

Tancik, et al. (Block-NeRF: Scalable Large Scene Neural View Synthesis) (Year: 2022).*

(Continued)

*Primary Examiner* — Daniel G Mariam
(74) *Attorney, Agent, or Firm* — David K. Mattheis

(57) ABSTRACT

Detecting data anomalies by receiving a query image, determining a query image viewpoint according to a trained neural radiance field model, generating a 2D reference image according to the neural radiance field model, determining a difference between the query image and the reference image, and highlighting the difference in a presentation of the query image.

20 Claims, 2 Drawing Sheets

(56) References Cited

OTHER PUBLICATIONS

Ehret, et al., "Image Anomalies: a Review and Synthesis of Detection Methods," Journal of Mathematical Imagng and Vision Manuscript, arXiv:1808.02564v2 [cs.CV] Jun. 3, 2019, 36 Pgs.

Jeong, et al., "Time-Series Anomaly Detection with Implicit Neural Representation," arXiv:2201.11950v1 [cs.LG] Jan. 28, 2022, 9 Pgs.

Lee, et al., "AnoViT: Unsupervised Anomaly Detection and Localization with Vision Transformer-based Encoder-Decoder," arXiv:2203.10808v1 [cs.CV] Mar. 21, 2022, 9 Pgs.

Marimont, et al., "Implicit field learning for unsupervised anomaly detection in medical images," arXiv:2106.05214v1 [eess.IV] Jun. 9, 2021, 10 Pgs.

Martin-Brualla, et al., "NeRF in the Wild: Neural Radiance Fields for Unconstrained Photo Collections," arXiv:2008.02268v3 [cs.CV] Jan. 6, 2021, 15 Pgs.

Mildenhall, et al., "NeRF: Representing Scenes as Neural Radiance Fields for View Synthesis," arXiv:2003.08934v2 [cs.CV] Aug. 3, 2020, 25 Pgs.

Rematas, et al., "Novel Views of Objects from a Single Image," arXiv:1602.00328v2 [cs.CV] Aug. 15, 2016, 14 Pgs, <https://arxiv.org/abs/1602.00328#:~:text=Taking%20an%20image%20of%20an,final%20and%20not%20easily%20revertible>.

Wang, et al., "NeRF—: Neural Radiance Fields Without Known Camera Parameters," arXiv:2102.07064v4 [cs.CV] Apr. 6, 2022, 17 Pgs.

Yu, et al., "pixelNeRF: Neural Radiance Fields from One or Few Images," Accessed on Feb. 5, 2023, 10 Pgs, <https://openaccess.thecvf.com/content/CVPR2021/papers/Yu_pixelNeRF_Neural_Radiance_Fields_From_One_or_Few_Images_CVPR_2021_paper.pdf>.

* cited by examiner

100

ANOMALY DETECTION USING NEURAL RADIANCE FIELDS

FIELD OF THE INVENTION

The disclosure relates generally to the detection of anomalies in image data. The invention relates particularly to the detection of data anomalies using neural radiance fields.

BACKGROUND

Classic methods solve the problem of anomaly detection by either comparing the query image to a model of the reference image distribution or by matching the query image to a reference image and warping the reference image to fit the query image. These methods do not use the 3D structure of the object. They can fail with query images captured from a camera viewpoint that differs from the camera view points in the reference training set.

The key component of implicit neural representation is a neural network trained to represent a signal by learning to predict the value of the signal given coordinates as input. Neural radiance field (NeRF) research suggests modeling 3D signals (objects or scenes) from a set of captured 2D images by training the 3D representation model with gradient descent through a differentiable rendering engine, enforcing alignment between rendered 2D images and the input images. In NeRF the input 2D image camera viewpoint is given, Further research extends this idea to the case where the camera viewpoints are not available, and gradient descent through both the rendering engine and the 3D model is used to find the viewpoint for each input image.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the detection of anomalies in query data samples.

Aspects of the invention disclose methods, systems and computer readable media associated with detecting data anomalies by receiving a query image, determining a query image viewpoint according to a trained neural radiance field model, generating a 2D reference image according to the neural radiance field model, determining a difference between the query image and the reference image, and highlighting the difference in a presentation of the query image.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
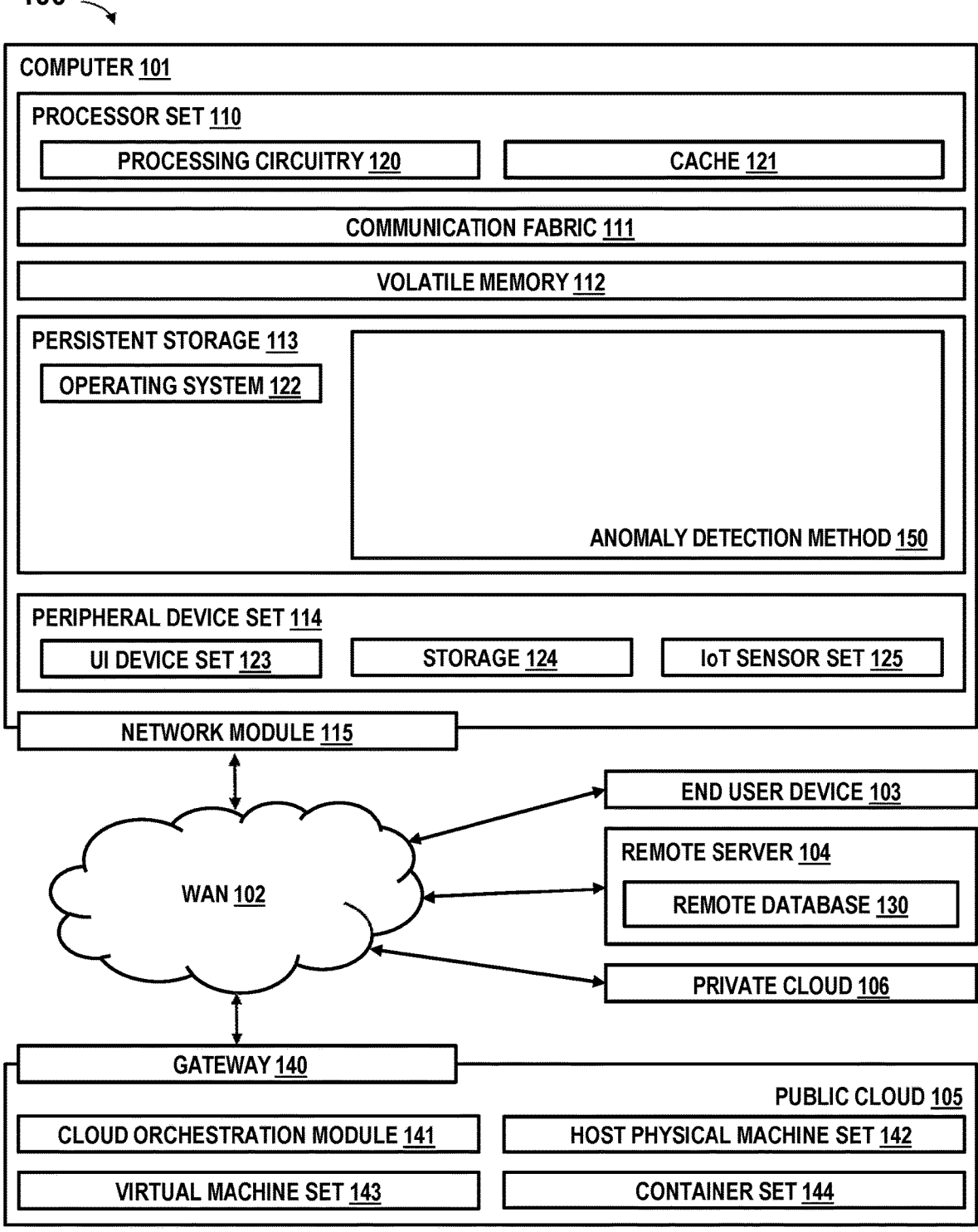
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

This invention solves the problem of detecting anomalies in image data in industrial and other settings. Given only normal images of an object (without defects) at training time, disclosed methods train a neural radiance field model. After training is completed, given a query image of the same object as the normal images, methods predict and classify the query image as either a member of the normal image distribution or as an image containing an anomaly (a defect). Methods identify such defects. Methods can be used to detect or highlight changes over time of structures and scenes, e.g. given old images of a bridge detect in a new image if there are changes (a new crack, rust, etc.).

Aspects of the present invention relate generally to anomaly detection methods and systems and, more particularly, to methods and systems utilizing neural radiance fields for the detection of anomalies in image data. In embodiments, an anomaly detection system receives normal images of an object or a collection of objects. The system utilizes the normal images to train a neural radiance field model for the object(s). The neural radiance field model enables the generation of an image of the objects from different viewpoints. The system then receives a query image of the objects, determines a viewpoint of the query image using the neural radiance field model, generates of a reference image of the objects using the determined viewpoint, compares the query and reference images of the objects resulting in identification and presentation of anomalous aspects of the query image relative to the reference image.

In accordance with aspects of the invention there is a method for automatically detecting anomalies in imagery data, the method includes receiving query imagery data of an object, utilizing a neural radiance field model trained using normal images of the object to determine a viewpoint associated with the query image. The method then utilizes the determined viewpoint of the object to render a representation of the object using a differentiable rendering engine. Having generated the object view having the same viewpoint as the query image, the method compares the generated image and the query image to identify pixel level differences between the two images. The pixel level differences indicate an anomaly in the query image, i.e. a change in the appearance of the object from the normal images utilized in training the neural radiance field model for the object. In one embodiment, the method presents the query image after highlighting the location(s) of anomalies detected in the query image.

Aspects of the invention provide an improvement in the technical field of anomaly detection in imagery. Conventional methods solve this problem by either comparing the query image to a model of the reference image distribution or by matching to a reference image and warping it to fit the query image. These methods do not use the 3D structure of the object. Thus, the methods can fail when the query image is captured from a camera viewpoint that is different from the camera view points in the reference training set. Implementations of the invention leverage a neural radiance field model trained using normal images of the target object to determine a viewpoint of the query image, then utilize the determined viewpoint in generating a reference image for comparison to the query image. This provides the improvement of comparing the query image to a rendered image of the object generated using the same viewpoint as the query image.

Aspects of the invention also provide an improvement to computer functionality. In particular, implementations of the invention are directed to a specific improvement to the way anomaly detection systems operate, embodied in the training of a neural radiance field model using normal images of a target object as the training data set, then freezing the model weights prior to utilizing the model to determine a viewpoint associated with the query image. Systems and methods then utilize the determined viewpoint in rendering a reference image utilized for comparison with the query image to identify anomalies in the query image.

In an embodiment, one or more components of the system can employ hardware and/or software to solve problems that are highly technical in nature (e.g., training a neural radiance field model using normal images, determining a query image viewpoint according to the neural radiance field model, rendering a reference image according to the viewpoint, determining differences between the query and reference images, highlighting those differences, presenting an image including the highlighted differences, etc.). These solutions are not abstract and cannot be performed as a set of mental acts by a human due to the processing capabilities needed to facilitate image data anomaly detection, for example. Further, some of the processes performed may be performed by a specialized computer for carrying out defined tasks related to detecting anomalies in image data. For example, a specialized computer can be employed to carry out tasks related to anomaly detection or the like.

In one embodiment, the anomaly detection method receives "normal" images of an object. For purposes of this discussion, the object may include a single object or a set of objects captured in a single image. For this embodiment, the characterization of the images as normal indicates that the object in the image contains no anomalies. In this embodiment, the method utilizes the received normal images in training a neural radiance field model using the received images to generate a five-dimensional data set, object coordinates as well as viewing direction coordinates, yielding a differentiable neural radiance field model from the set of normal images. Such model training may succeed even with a sparse set of normal images of the object.

In one embodiment, once trained, the method saves the node weights of the model, or freezes the model in the state it had at the end of the last training epoch. In this embodiment, the method retains the frozen version of the model and provides this version for use in generating images and determining viewpoints of query images.

In one embodiment, once trained the model enables a determination of a viewpoint associated with a new provided query image outside the normal training data image set. Optimizing the weights of the trained model against the query image to minimize the rendering loss yields an output including the predicted viewpoint for the query image. The trained model also enables the generation of 2D images of the target object according to a provided viewpoint input.

After training the model, the method receives a new image of the object, the query image of the target. Utilizing the trained model, the method determines a viewpoint for the query image by minimizing the rendering loss of the model according to potential viewpoint values. In this embodiment, the method then passes the viewpoint output and object data from the trained model to a rendering engine. The rendering engine generates a three-dimensional (3D) representation of the target, object from the viewpoint provided as the output of the model taking the query image as an input. The rendering engine may also generate two-dimensional reference images of the target object from various viewpoints.

In one embodiment, having generated a reference image of the target object having the viewpoint of the query image, the method then compares the query image and the reference image. In this embodiment, the method performs a pixel-by-pixel comparison of the two images, noting each pixel having differences in values between the reference and query images. In this embodiment, the method stores the locations of all pixels having differences as well as the value differences between pixels such as an L2 difference between pixels. In one embodiment, methods store the max value difference between pixels.

In one embodiment, the method provides a data table indicating the differences noted during the comparison of the reference and query images. In one embodiment, the method generates a composite image including the query image and indications highlighting the locations of anomalies noted between the reference and query images. In this embodiment, the highlighting may comprise altering pixel attributes of the anomalous pixels to enhance the visibility of such pixels. highlighting may comprise adding a marker, such as an arrow or outline, to enhance the visibility of the anomalous regions of the query image.

In one embodiment, the method defines a depth map for the query image and the reference image. In this embodiment, the method utilizes data for a red-green-blue-depth camera, or RGBD rendering engine taking model data as an input. In this embodiment, the method then further compares the reference and query images on the additional basis of the depth data of each image pixel in addition to other pixel attributes such as pixel color model attributes.

As shown in FIG. 1, computing environment 100 contains an example of an environment for the execution of at least some of the computer code involved in performing the inventive methods, such as the disclosed neural radiance field model based anomaly detection method, block 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
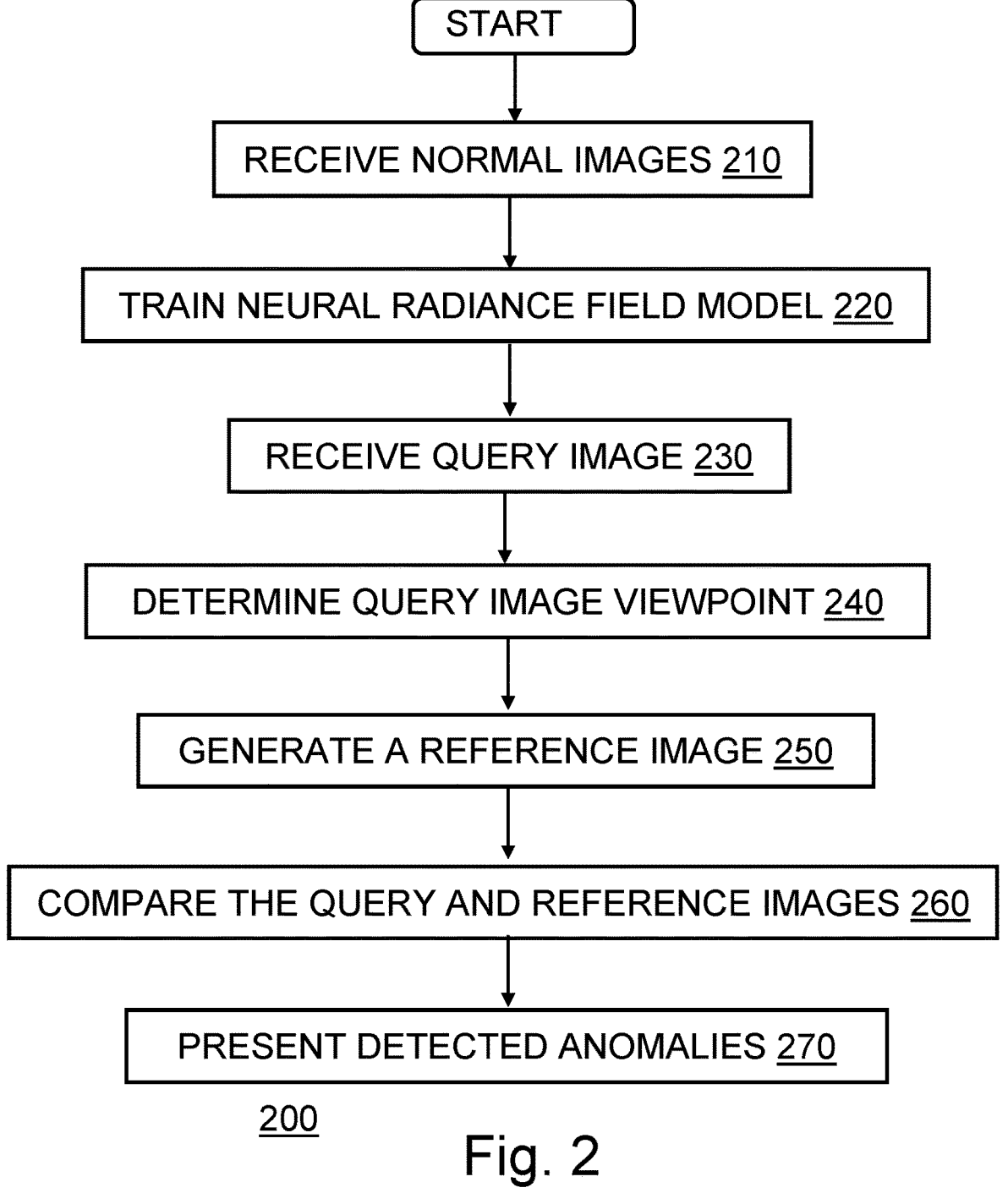
FIG. 2 provides a flowchart depicting an operational sequence, according to an embodiment of the invention.

FIG. 2 provides a flowchart 200, illustrating exemplary activities associated with the practice of the disclosure. After program start, at block 210, the anomaly detection model receives normal images associated with a target object. In one embodiment, the objects depicted in such normal images contain no anomalies.

At block 220, the method trains a neural radiance field model utilizing the normal images of the target object as the training data set for the model. Once trained the neural radiance field model enables a determination of a viewpoint associated with a query image as well as the determination of image date associate with a specified image viewpoint of the target object. Once trained the method provides the trained model for use in detecting anomalies.

At block 230, the method receives a query image of the target object. In this embodiment, the query image differs from any of the normal images provided as part of the model training data set.

At block 240, the method determines a viewpoint for the query image using the previously trained neural radiance field model. The method outputs the determined viewpoint to a rendering engine. The method further outputs model data associated with rendering the target object from the determined viewpoint, to the rendering engine.

At block 250, the method utilizes the rendering engine to generate a 3D representation of the target object from the determined viewpoint. The method then utilizes the 3D representation in generating a two-dimensional reference image of the target object.

At block 260, the method compares the query image of the target object with the reference image of the target object, and determines differences (anomalies) present between the data of the two images.

At block 270, the method presents a version of the query image augmented to highlighted to enhance the visibility of the detected anomalies. In one embodiment, the method presents both the augmented query image as well as the original query image.

In one embodiment, application of the method includes the routine capture of images of critical infrastructure, such as bridges. In this embodiment, the application of the method yields a trained neural radiance field model for each target piece of infrastructure. After application of the method yielding the trained model, subsequent images may be submitted as query images yielding output data relating changes to the target infrastructure objects.

In one embodiment, application of the method includes the routine capture of images of works in progress, such as building under construction. In this embodiment, the application of the method yields a trained neural radiance field model for each target work in progress. After application of the method yielding the trained model, subsequent images may be submitted as query images yielding output data relating changes to the target as the work progresses.

It is to be understood that although this disclosure includes a description on cloud computing, implementation of the teachings recited herein are not limited to a cloud computing environment. Rather, embodiments of the present invention are capable of being implemented in conjunction with any other type of computing environment now known or later developed.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for detecting data anomalies, the method comprising:
    receiving a query image;

determining a query image viewpoint according to a trained model by minimizing rendering loss between weights of the trained model and the query image;
    generating a two-dimensional reference image according to the query image viewpoint determined by the model;
    determining a difference between the query image and the reference image; and
    highlighting the difference in a presentation of the query image.

2. The computer implemented method according to claim 1, further comprising:
    receiving a of set images;
    training a neural radiance field model according to the set of images; and
    providing the trained neural radiance field model.

3. The computer implemented method according to claim 2, further comprising freezing the weights of the neural radiance field model.

4. The computer implemented method according to claim 1, wherein determining the query image viewpoint comprises optimizing the neural radiance field model for the query image viewpoint.

5. The computer implemented method according to claim 1, wherein determining the difference between the query image and the reference image comprising comparing query image and reference image pixels.

6. The computer implemented method according to claim 1, further comprising
    defining a query image depth map;
    defining a reference image depth map;
    determining a difference between the query image depth map and the reference image depth map; and
    presenting details about the difference to a user.

7. The computer implemented method according to claim 6, further comprising determining the difference using a red-green-blue-depth camera.

8. A computer program product for detecting anomalies, the computer program product comprising one or more computer readable storage media and collectively stored program instructions on the one or more computer readable storage media, the stored program instructions which, when executed, cause one or more computer systems to:
    receive a query image;
    determine a query image viewpoint according to a trained neural radiance field model by minimizing rendering loss between weights of the trained neural radiance field model and the query image;
    generate a two-dimensional reference image according to the query image viewpoint determined by the model neural radiance field model;
    determine a difference between the query image and the reference image; and
    highlight the difference in a presentation of the query image.

9. The computer program product according to claim 8, the computer program instructions further causing the one or more computer systems to:
    receive a set of images;
    train a neural radiance field model according to the set of images; and
    provide the trained neural radiance field model.

10. The computer program product according to claim 9, the computer program instructions further causing the one or more computer systems to freeze the weights of the neural radiance field model.

11. The computer program product according to claim 8, wherein determining the query image viewpoint comprises optimizing the neural radiance field model for the query image viewpoint.

12. The computer program product according to claim 8, wherein determining the difference between the query image and the reference image comprising comparing query image and reference image pixels.

13. The computer program product according to claim 8, the computer program instructions further causing the one or more computer systems to:

define a query image depth map;

define a reference image depth map;

determine a difference between the query image depth map and the reference image depth map; and present details about the difference to a user.

14. The computer program product according to claim 13, further comprising determining the difference using a red-green-blue-depth camera.

15. A computer system for detecting data anomalies, the computer system comprising:

one or more computer processors;

one or more computer readable storage devices; and stored program instructions on the one or more computer readable storage devices for execution by the one or more computer processors, the stored program instructions which, when executed, cause the one or more computer processors to:

receive a query image;

determine a query image viewpoint according to a trained neural radiance field model by minimizing rendering loss between weights of the trained neural radiance field model and the query image;

generate a two-dimensional reference image according to the query image viewpoint determined by the model neural radiance field model;

determine a difference between the query image and the reference image; and highlight the difference in a presentation of the query image.

16. The computer system according to claim 15, the computer program instructions further causing the one or more processors to:

receive a set of images;

train a neural radiance field model according to the set of images; and provide the trained neural radiance field model.

17. The computer system according to claim 16, the computer program instructions further causing the one or more processors to freeze the weights of the neural radiance field model.

18. The computer system according to claim 15, wherein determining the query image viewpoint comprises optimizing the neural radiance field model for the query image viewpoint.

19. The computer system according to claim 15, wherein determining the difference between the query image and the reference image comprising comparing query image and reference image pixels.

20. The computer system according to claim 15, the computer program instructions further causing the one or more processors to:

define a query image depth map;

define a reference image depth map;

determine a difference between the query image depth map and the reference image depth map; and present details about the difference to a user.

* * * * *